Lobdell & Smith.
Hay Fork.
No. 99,449.  Patented Feb. 1, 1870.
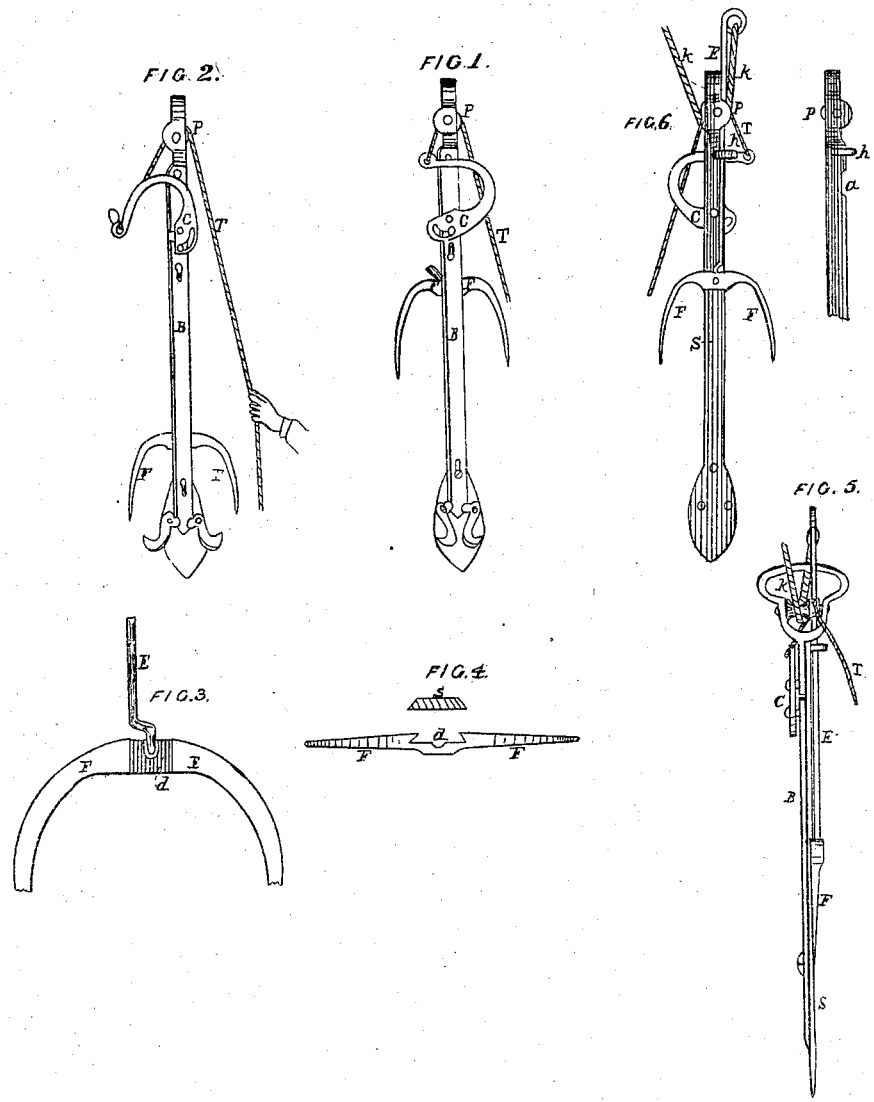
Witnesses
J. P. Mulloy
Joshua Whitney
Inventors
James E. Lobdell
Leroy H. Smith
By their Attorney A. DuBois

United States Patent Office.

JAMES E. LOBDELL AND LEROY H. SMITH, OF CENTRE LISLE, NEW YORK.

Letters Patent No. 99,449, dated February 1, 1870.

IMPROVEMENT IN HAY-FORKS.

The Schedule referred to in these Letters Patent and making part of the same.

We, JAMES E. LOBDELL and LEROY H. SMITH, both of Centre Lisle, in the county of Broome, and State of New York, have invented certain Improvements in Horse Hay-Forks, of which the following is a specification.

Our invention relates to that class of horse hay-forks, commonly called "harpoon-forks," which has a sharp point or cutting-edge, to penetrate the hay or straw, and from which prongs or hooks are thrown out to catch and lift the same when the fork is to be drawn up. It is intended, more particularly, to be used in connection with the combined hay-fork and hay-knife, for which Letters Patent were granted to James E. Lobdell, March 10, 1868.

Our invention consists in providing a movable binding-fork, attached to the main cutting-shaft, and operated by the draught-rope, so that in hoisting the hay, the binding-fork is forced down upon it, holding it firmly on the lifting-hooks or prongs; the said binding-fork being also detachable.

In the accompanying drawings—

Figure 1 shows the position of the parts when ready to be inserted in the hay, without the draught-rope and rod;

Figure 2, the position of the same when ready to be drawn up with the hay;

Figure 3, a separate view of the binding-tines, with draught-rod attached; and

Figure 4, a top view of the same.

Figure 5, an edgewise view, and

Figure 6, a rear view, showing the connection of the draught-rod with the binding-tines.

F F are the binding-tines;

E, the draught-rod; and k, the draught-rope.

To attach the binding-tines to the main cutting-shaft s, so that they may be moved up and down without becoming detached, the shaft s is provided with bevelled edges, which fit into a corresponding recess made at the top of the tines, as shown in fig. 4 and in fig. 3. The draught-rod E is attached to the binding-tines, as shown in fig. 3, being hooked through the same, and let into the recess $d$ by a still deeper recess, so that the rod may be between the binding-tines and the main shaft s, as shown in fig. 6.

To detach the tines F F from the shaft s, a recess is made in the shaft at $a$, near the upper end. By slipping the binding-tines up to this recess, they will become detached, and the draught-rod E will also be released, and may be drawn up through the hook or staple $h$, and taken off, as they may not be needed in some kinds of hay; but in loading and unloading straw and fine hay the binding-tines are indispensable.

In operating the binding-tines, the draught-rope $k$ is attached to the upper end of the rod E, and passed under the pulley P, and thence up to the hoisting-pulley, over which it passes, and then descends to the horse or other power, by which the whole is raised. By this means the binding-tines are forced down upon the hay or straw, at the same time it is being hauled up to the place where it is desired to deposit it.

We claim, as our invention—

1. The detachable tines F F, with dovetail notch $d$, in combination with bar S, having notch $a$, substantially as shown and described.

2. The tines F F and bar s, constructed as described, in combination with rod E, draught-rope $k$, and pulley P, substantially as described, and for the purposes set forth.

JAMES E. LOBDELL.
LEROY H. SMITH.

Witnesses:
L. S. SMITH,
H. N. HOWLAND.